United States Patent
Lai

(10) Patent No.: US 7,000,082 B2
(45) Date of Patent: Feb. 14, 2006

(54) CACHE VICTIM SECTOR TAG BUFFER

(75) Inventor: Chunrong Lai, Beijing (CN)

(73) Assignee: Intel Corporation, Santa Clara, CA (US)

(*) Notice: Subject to any disclaimer, the term of this patent is extended or adjusted under 35 U.S.C. 154(b) by 57 days.

(21) Appl. No.: 10/365,636

(22) Filed: Feb. 13, 2003

(65) Prior Publication Data

US 2004/0128447 A1 Jul. 1, 2004

(30) Foreign Application Priority Data

Dec. 30, 2002 (WO) .................... PCT/CN02/00935

(51) Int. Cl.
*G06F 12/00* (2006.01)
(52) U.S. Cl. ................. 711/156; 711/118; 711/133
(58) Field of Classification Search ........ 711/118–140, 711/156
See application file for complete search history.

(56) References Cited

U.S. PATENT DOCUMENTS

| 4,797,814 A | * | 1/1989 | Brenza ........................ 711/3 |
| 5,692,152 A | * | 11/1997 | Cohen et al. .............. 711/140 |
| 5,845,324 A | * | 12/1998 | White et al. ............... 711/128 |
| 5,893,147 A | * | 4/1999 | Deng ......................... 711/130 |
| 6,199,142 B1 | * | 3/2001 | Saulsbury et al. ......... 711/118 |
| 2002/0042860 A1 | | 4/2002 | Murakami et al. |
| 2002/0188809 A1 | | 12/2002 | Kershaw |
| 2003/0033492 A1 | * | 2/2003 | Akiyama et al. .......... 711/156 |
| 2004/0103250 A1 | * | 5/2004 | Alsup ........................ 711/118 |

FOREIGN PATENT DOCUMENTS

| EP | 0 817 067 A2 | 7/1996 |
| EP | 0 817 067 A3 | 3/1999 |

OTHER PUBLICATIONS

"Sector Cache Design and Performance", 10 pages, Jeffrey B. Rothman and Allan Jay Smith.

"Improving Direct-Mapped Cache Performance by the Addition of a Small Fully-Associative Cache and Prefetch Buffers," 1990, 10 pages, Norman P. Jouppi, Digital Equipment Corporation Western Research Lab, 100 Hamilton Ave., Palo Alto, CA 94301.

* cited by examiner

*Primary Examiner*—Nasser Moazzami
(74) *Attorney, Agent, or Firm*—Kenyon & Kenyon

(57) ABSTRACT

A method of operating a sub-sector cache includes receiving a request for a first sub-sector of a first cache line. The method further includes identifying a first replaced line in a cache data RAM, the first replaced line including a plurality of replaced sub-sectors. The method further includes storing the first sub-sector in the cache data RAM in place of a first replaced sub-sectors and storing an identifier of at least a second replaced sub-sector in a victim sector tag buffer.

24 Claims, 3 Drawing Sheets

CACHE VICTIM SECTOR TAG BUFFER

FIELD OF THE INVENTION

The present invention is directed to computer cache memory. More particularly, the present invention is directed to a cache memory having sectors and a victim sector tag buffer.

BACKGROUND INFORMATION

Advances in computer processor speeds increasingly highlight a growing gap between the relatively high speed of the computer processors and the relatively low speed of computer memory systems. If a computer processor is constantly waiting for data from the memory system, the speed of the processor cannot always be utilized.

One way to increase the speed of a computer memory system is to improve the memory hierarchy design of the computer memory system. Computer memory systems typically include different levels of memory, including fast cache memory, slower main memory, and even slower disk memory. Improved designs of cache memory increase the likelihood of a cache memory "hit", which avoids the time penalty of having to retrieve data from main memory.

One improved type of cache memory is sector cache. With sector cache, a cache "line" is divided into sub-sectors. One example of sector cache is found on the Pentium 4 processor from Intel Corp. The Pentium 4 processor includes an L2 cache which has a 128-byte long cache line that is divided into two 64-byte sub-sectors.

With sector cache, a cache line miss results in all sub-sectors of the cache line being marked as "invalid" using an invalid bit. However, only a single sub-sector is read on a miss. Therefore, the remaining sub-sectors of the line continue to have invalid or unusable data that takes up space in the cache memory.

Based on the foregoing, there is a need for an improved cache memory system having sub-sectors.

DETAILED DESCRIPTION

One embodiment of the present invention is a cache that includes a victim sector tag ("VST") buffer. The VST buffer identifies sub-sectors of replaced lines that include valid data, despite the presence of an "invalid" flag for that sub-sector.

Figure 1:
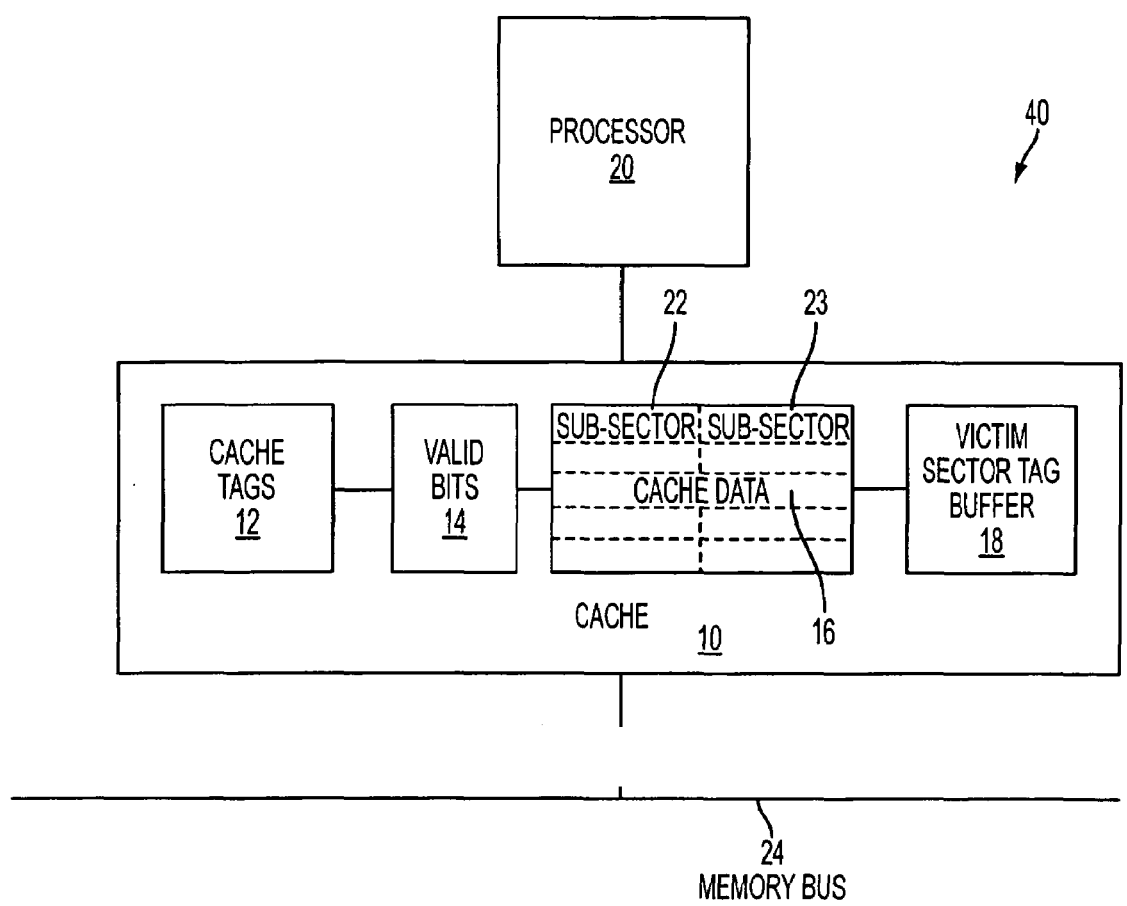
FIG. 1 is a block diagram of a computer system that includes a cache in accordance with one embodiment of the present invention.

FIG. 1 is a block diagram of a computer system 40 that includes a cache 10 in accordance with one embodiment of the present invention. Computer system 40 includes a processor 20, cache 10 and a memory bus 24. Processor 20 can be any type of general purpose processor. Cache 10 may be integrated within processor 20, or external to processor 20 as shown in FIG. 1. Memory bus 24 connects processor 20 and cache 10 to the remaining memory sub-system of computer system 40. Memory that may be coupled to memory bus 24 may include additional cache memory, random access memory ("RAM"), read-only memory ("ROM"), disk-drive memory, or any type of memory that may be present in a computer system.

Cache 10 includes a cache data RAM 16. Cache data RAM 16 stores cache data that is received either from processor 20, or from memory coupled to memory bus 24. In one embodiment, the data stored in cache data RAM 16 is stored in the form of cache "lines", which are blocks of data. Each cache line is divided into multiple sub-sectors (i.e., sub-sector 22 and sub-sector 23).

Cache 10 further includes a cache tag RAM 12. Cache tag RAM 12 stores "tags" or identifiers of each line stored in cache data RAM 16, and the corresponding location in cache data RAM 16 where the line is stored. For example, the first line in cache data RAM 16 may have a tag of "A" and may be stored in location 0200. Further, the second line in cache data RAM 16 may have a tag of "B" and may be stored in location 0400.

Cache 10 further includes a valid bits module 14. Valid bits module 14 stores a "valid" bit for each sub-sector of each line stored in cache data RAM 16. The valid bit indicates whether the corresponding sub-sector includes valid or invalid data.

Cache 10 further includes a VST buffer 18. VST buffer 18 stores entries which indicate when a sub-sector of a line stored in cache data RAM 16, which is marked as an invalid sector by valid bits module 14, actually stores valid data which can be used by processor 20.

Cache data RAM 16, Cache tag RAM 12 and valid bits module 14 generally operate as the prior art equivalent modules that implement a sub-sector cache system. In general, this operation begins when processor 20 requests a sub-sector of a line of data stored in memory. The memory request is processed by cache 10 by first identifying the tag of the line requested. The presence of the tag is searched in cache tag RAM 12. If the desired tag exists, the valid bit for the requested sub-sector of the line is queried in valid bits module 14. If the requested sub-sector is valid, then that sub-sector is retrieved from cache data RAM 16 and sent to processor 20.

A cache miss may occur if either the desired tag is not found in cache tag RAM 12 (i.e., the desired line is not in cache data RAM 16), or the requested sub-sector is invalid. When a cache miss occurs, one of the lines in cache data RAM 16 is designated as a "replaced line", and each sub-sector of the replaced line is marked as "invalid" in valid bits module 14 (and can be referred to as "replaced sub-sectors"). The requested sub-sector is then retrieved from memory bus 24 and stored in place of the corresponding sub-sector of the replaced line. The corresponding cache tag and valid bit is also updated. The remaining sub-sectors of the replaced line are not changed, but in prior art systems they remain unusable because these sub-sectors remain marked as invalid in valid bits module 14.

Figure 2:
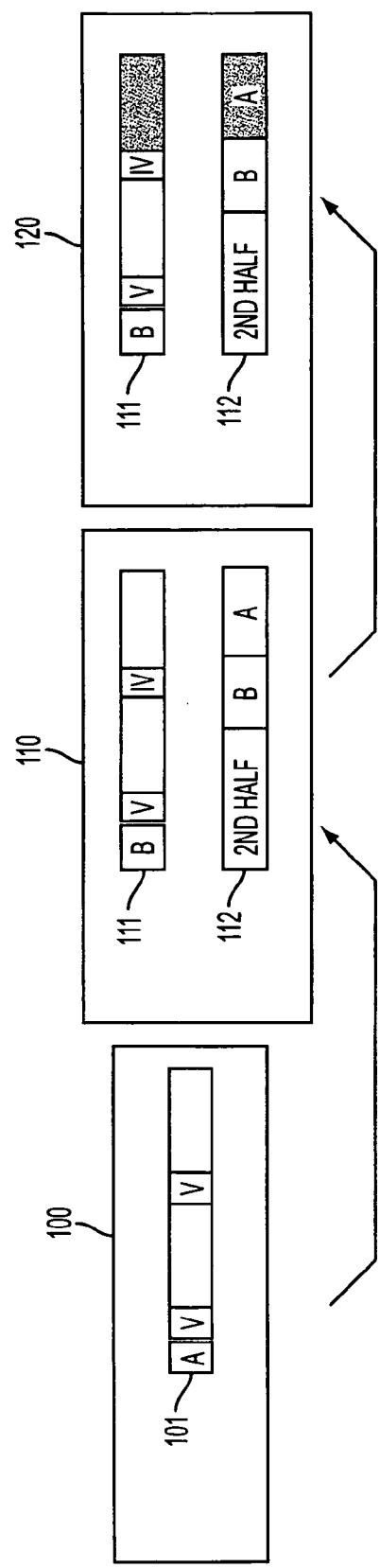
FIG. 2 provides an example of the storage of sub-sector tags in a victim sector tag buffer in accordance with one embodiment of the present invention.

In one embodiment of the present invention, VST buffer 18 stores the sub-sector tags of recently replaced lines that include usable data. FIG. 2 provides an example of the storage of sub-sector tags in VST 18 in accordance with one embodiment of the present invention.

At box 100, tag A cache line, identified at 101, includes two valid sub-sectors (identified by the two "V"s)

At box 110, processor 20 requests the first sub-sector of tag B cache line. Tag B is not stored in cache data RAM 16. Therefore, tag A cache line is designated as the replaced line and both sub-sectors are marked as invalid, The first sub-sector of tag B cache line is then retrieved and stored in cache data RAM 16 in place of tag A cache line. As identified at 111, tag B cache line has valid data in its first sub-sector, and invalid data in its second sub-sector. However, the data in the second sub-sector is in fact valid data of the second sub-sector of tag A cache line. Consequently, an entry 112 is stored in VST buffer 18 that indicates that the second half sub-sector of tag B cache line includes valid data for tag A.

At box 120, processor 20 requests the second sub-sector of tag A cache line. The first check of cache tag RAM 12 results initially in a cache miss because tag A cache line was replaced by tag B cache line at box 110. However, VST buffer 18 is then queried, and entry 112 indicates that the data is available at the second half of tag B cache line. Consequently, the requested data is retrieved from tag B cache line (indicated by shaded portion of 111) and a cache miss is avoided.

In other embodiments, VST buffer 18 can be queried before the requested cache line tag is searched in cache tag RAM 12.

The existence of VST buffer 18 in accordance with embodiments of the present invention prevents some cache misses, thus increasing the efficiency of cache 10. Unlike the traditional data buffers, VST buffer 18 buffers the sector tags that have been replaced out of the cache recently, so that valid data still stored in the cache can be used.

In order to provide an example of the advantages of embodiments of the present invention, simulation studies were done using a cache hierarchy of 8 KB direct level 1 ("DL1"), a cache line size of 32-byte, an 8-way associate level 2 ("L2") cache size of 512 KB, the L2 using a least recently used ("LRU") replacement policy with a 128-byte long cache line, and a 64-byte long sub cache line. All extra actions related with the VST buffer, including insert update and remove, are performed when there is a cache miss (whole cache line miss or sub-sector miss), so the VST buffer will not influence the cache hit penalty. The efficiency of the VST buffer can be computed from the following formula:

[cache misses save rate=(cache misses of sector cache−cache misses of sector cache with VST buffer)/(cache misses of sector cache−cache misses of non-sector cache)]

Where "non-sector cache" is a 512 KB size, 64-byte cache line size, 8-way associative L2 cache with LRU replacement policy. Several benchmarks are used for the evaluation: "mesa", "art" and "ammp" from the Spec2K organization, and a commercial-like workload "LVCSR" which is a speech recognition system.

The following cache misses save rate of a VST buffer of Table 1 in accordance with one embodiment of the present invention was obtained with an LRU replaced VST buffer:

TABLE 1

| cache misses save rate of the victim sector tag buffer | | | | | |
|---|---|---|---|---|---|
| 8 entries | 16 entries | 32 entries | 64 entries | 128 entries | 256 entries |
| LVCSR 0.38% | 0.73% | 1.36% | 2.64% | 4.91% | 8.31% |
| Mesa 4.54% | 5.04% | 6.43% | 9.01% | 9.40% | 9.49% |
| Ammp 3.84% | 5.95% | 8.88% | 13.1% | 18.3% | 25.1% |
| Art 20.9% | 29.4% | 43.2% | 59.5% | 69.8% | 151% |

One embodiment of a VST buffer can be implemented using the following software or hardware code of Table 2:

TABLE 2

Victim sector tag buffer handling code when cache misses

```
if ((blockmiss == 0) && (miss == 1)) { //cache line hit, sub sector miss,
    if (ExistVSTbuffer == 1 && FitforVSTbuffer == 1) {//fit for Vbuffer currently & victim buffer exists
        int match;
        match = indexBufSaddr(c, D4ADDR2SUBBLOCK(c,m.address));
        //Search the victim buffer via the subblockaddr
        //if find, the sub-sector is buffered by VST buffer and will be replaced soon, disable the VST entry
        if (match >= 0) disableVbufferEntry(c, match);
    }
}
    ................
if (blockmiss == 1) { //whole cache line miss
    if (ExistVSTbuffer == 1 && FitforVSTbuffer == 1) {//fit for Vbuffer currently & victim buffer exists
        match = indexBufVaddr(c, D4ADDR2SUBBLOCK(c,m.address));
        //search the victim buffer via the victimaddr
        if(match >= 0) { //if find, means the sub-sector are actually in cache, VST can help to identify them
            ptr = reverseVbufferEntry(c,match);
            //revise the victim buffer, cache structure
            if (ptr != NULL) {
                blockmiss = 0;
                miss = 0; //identify a hit here
            }
        }
    }
}
```

Embodiments of the present invention also provide advantages over prior art victim buffer systems when a number of streaming (or sequential) accesses are going to the cache. With prior art victim buffer systems, many cache lines will be evicted which will thrash the victim buffer.

Figure 3:
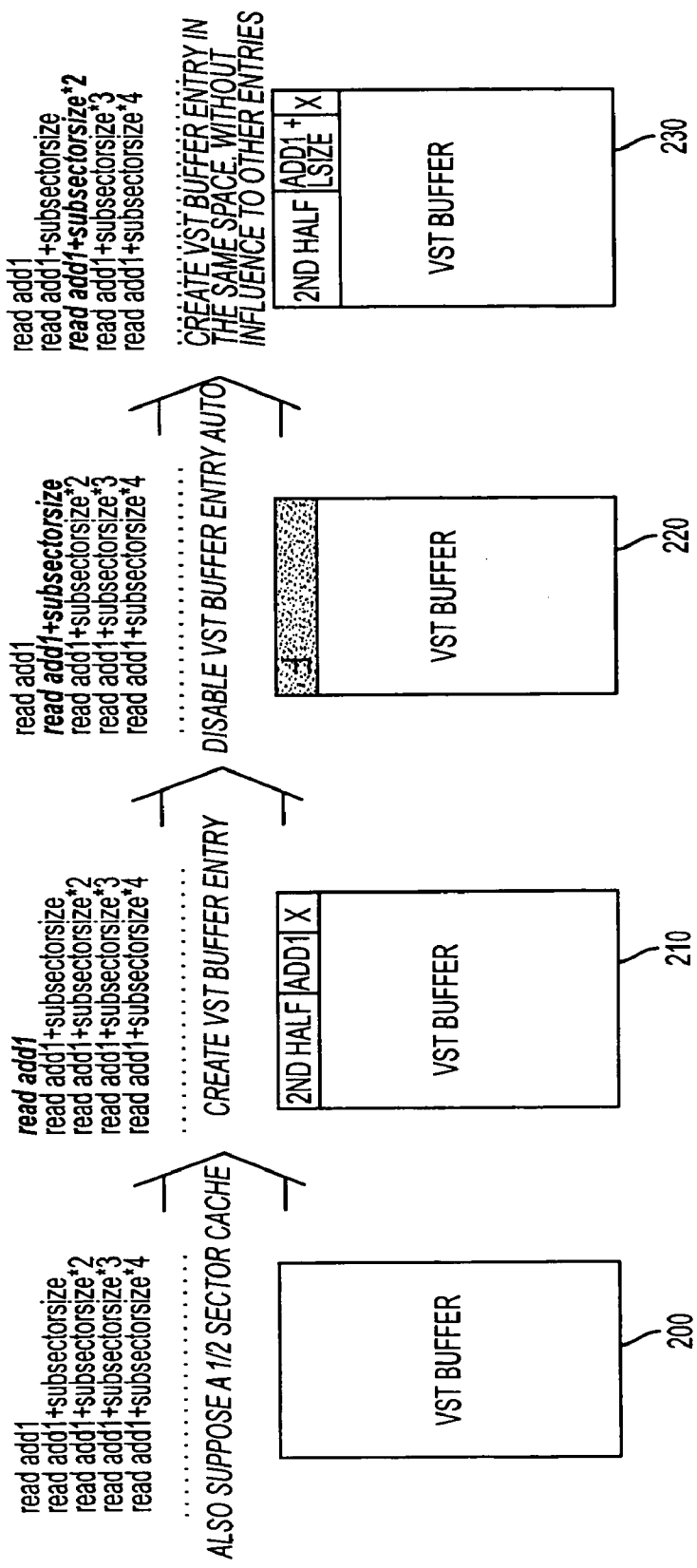
FIG. 3 illustrates a sequence of streaming accesses that are handled by a victim sector tag buffer in accordance with one embodiment of the present invention.

FIG. 3 illustrates a sequence of streaming accesses that are handled by a VST buffer in accordance with one embodiment of the present invention. At 200, the VST buffer (assuming a ½ sector cache) is empty. At 210, after a "read add1" instruction, a VST buffer entry is created. At 220, after a "read add1+subsectorsize" instruction, the VST buffer entry is disabled. Finally, at 230, after a "read add1+subsectorsize*2" instruction, an additional buffer entry in the VST buffer is created in the same space as the previous VST buffer entry, without influencing other VST buffer entries. Therefore, as shown, the VST buffer is not thrashed during the streaming of instructions.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of operating a sub-sector cache comprising:
   receiving a request for a first sub-sector of a first cache line;
   identifying a first replaced line in a cache data random access memory (RAM), the first replaced line comprising a plurality of replaced sub-sectors;
   storing the first sub-sector in the cache data RAM in place of a first replaced sub-sector; and
   storing an identifier of at least a second replaced sub-sector in a victim sector tag buffer.

2. The method of claim 1, wherein the first sub-sector is retrieved from a memory subsystem.

3. The method of claim 1, wherein the second replaced sub-sector comprises valid data of a second cache line.

4. The method of claim 3, further comprising:
   receiving a request for a second sub-sector of the second cache line;
   retrieving the identifier from the victim sector tag buffer; and
   retrieving the second sub-sector from the first cache line in the cache data RAM based on the identifier.

5. The method claim 1, further comprising:
   marking the replaced sub-sectors as invalid.

6. The method of claim 1, wherein the first sub-sector of the first cache line is not stored in the cache data RAM when the request is received.

7. The method of claim 1, wherein the identifier comprises a tag of the first cache line.

8. The method of claim 7, further comprising disabling the identifier.

9. A cache system comprising:
   a sector cache data random access memory (RAM) to store a plurality of cache lines, each of said cache lines including multiple sub-sectors;
   a cache tag RAM coupled to the cache data RAM; and
   a victim sector tag buffer coupled to the cache data RAM, said victim sector tag buffer to store entries to indicate whether a sub-sector of a cache line of said cache data RAM stores valid data.

10. The cache system of claim 9, further comprising:
    a valid bits module coupled to the cache data RAM.

11. The cache system of claim 9, wherein said victim sector tag buffer is configured to store an identity of a sub-sector of a replaced line.

12. The cache system of claim 10, wherein the sub-sector of the replaced line is marked as invalid in said valid bits module.

13. The cache system of claim 10, wherein the identity comprises a tag of a cache line stored in said cache data RAM.

14. The cache system of claim 11, wherein said victim sector tag buffer is further configured to disable the identity.

15. A computer system comprising:
    a processor;
    a cache system coupled to said processor; and
    a memory bus coupled to said cache system;
    wherein the cache system comprises:
       a sector cache data random access memory (RAM) to store a plurality of cache lines, each of said cache lines including multiple sub-sectors;
       a cache tag RAM coupled to the cache data RAM; and
       a victim sector tag buffer coupled to the cache data RAM, said victim sector tag buffer to store entries to indicate whether a sub-sector of a cache line of said cache data RAM stores valid data.

16. The computer system of claim 15, said cache system further comprising:
    a valid bits module coupled to the cache data RAM.

17. The computer system of claim 15, wherein said victim sector tag buffer is configured to store an identity of a sub-sector of a replaced line.

18. The computer system of claim 17, wherein the sub-sector of the replaced line is marked as invalid in said valid bits module.

19. The computer system of claim 17, wherein the identity comprises a tag of a cache line stored in said cache data RAM.

20. The computer system of claim 17, wherein said victim sector tag buffer is further configured to disable the identity to prevent thrashing.

21. A method of storing data in a cache comprising:
    designating a first cache line stored in a cache data random access memory (RAM), as a replaced line, the first cache line having a first replaced sub-sector and a second replaced sub-sector;
    retrieving a new sub-sector from a memory subsystem;
    storing the new sub-sector in place of the first replaced sub-sector; and
    storing an identity of the second replaced sub-sector in a victim sector tag buffer.

22. The method of claim 21, wherein the new sub-sector forms a second cache line.

23. The method of claim 21, wherein the identifier comprises a tag of the first cache line.

24. The method of claim 21, further comprising disabling the identifier.

* * * * *